United States Patent [19]

Melvin

[11] 4,040,005
[45] Aug. 2, 1977

[54] COMPOSITE SITUATION ANALYZER AND INSTRUMENT FLIGHT SYSTEM

[76] Inventor: William W. Melvin, 8434 Greenstone Drive, Dallas, Tex. 75231

[21] Appl. No.: 631,294

[22] Filed: Nov. 12, 1975

Related U.S. Application Data

[63] Continuation-in-part of Ser. No. 536,948, Dec. 23, 1974, Pat. No. 3,970,829.

[51] Int. Cl.² .............................................. G08G 5/02
[52] U.S. Cl. .............................. 340/27 AT; 73/178 T; 235/150.22; 244/181; 244/185; 343/108 R
[58] Field of Search ......................... 73/178 R, 178 T; 235/150.22, 150.2, 150.25, 150.26, 150.27; 244/181, 185, 186, 184; 318/583, 584; 340/27 R, 27 NA, 27 AT; 343/5 EM, 108 R

[56] References Cited

U.S. PATENT DOCUMENTS

| 3,521,227 | 7/1970 | Congleton | 340/27 R |
| 3,643,213 | 2/1972 | Yurasek et al. | 340/27 NA |
| 3,643,258 | 2/1972 | Balding | 73/178 T X |
| 3,668,622 | 6/1972 | Gannett | 340/27 R |

*Primary Examiner*—Stephen G. Kunin
*Attorney, Agent, or Firm*—Sughrue, Rothwell, Mion, Zinn and Macpeak

[57] ABSTRACT

Flight path angle is displayed relative to the aircraft reference indicator in a unique display and aircraft control system particularly useful during approach operations. Flight path angle is computed as a function of vertical velocity of the aircraft and air speed. Angle of attack is displayed as an angle relative to the flight path angle and is derived by computing the difference between pitch and flight path angle. Thrust command is displayed vertically relative to the aircraft reference indicator while heading command is displayed laterally with respect to the aircraft reference indicator. In the approach mode, a pitch command computer produces a pitch command signal for controlling an aircraft's pitch to maintain a desired angle of attack, and hence, a desired air speed; a thrust command computer produces a thrust command signal for controlling the flight path angle to maintain an aircraft on a desired glide path for landing; and a desired heading command computer produces a heading command signal for controlling the aircraft's heading to maintain a desired course or heading depending upon mode selection. In addition in the approach mode, the unique display and control system provides the capability of substituting the flight path angle with a ground path angle input. This offers the advantage that the projection of the aircraft symbol relative to the horizon is really where the aircraft is going relative to the ground. A runway symbol is displayed in the approach mode only and is driven by the output of a navigation receiver.

15 Claims, 9 Drawing Figures

COMPOSITE SITUATION ANALYZER AND INSTRUMENT FLIGHT SYSTEM

CROSS REFERENCE TO RELATED APPLICATION

This application is a continuation-in-part of my application Ser. No. 536,948, filed Dec. 23, 1974, now U.S. Pat. No. 3,970,829.

BACKGROUND OF THE INVENTION

FIELD OF THE INVENTION

The present invention generally relates to aircraft display and control systems, and more particularly, relates to a system providing a uniquely integrated display of aircraft performance and for controlling the flight path of the aircraft in which the thrust is varied to maintain the aircraft on a desired glide path, and the pitch of the aircraft is varied to maintain a desired angle of attack.

DESCRIPTION OF THE PRIOR ART

In normal flight, an aircraft's motion is controlled by its heading, thrust and angle of attack. Since air speed is a direct function of an aircraft's angle of attack, the angle of attack is usually controlled by a reference to the aircraft's air speed. Pitch and thrust, however, have primary and secondary effects upon an aircraft's flight performance. The primary effect of a change in pitch is that it causes a directly proportional change in the angle of attack because of the relationship between the aircraft's angle of attack, its pitch, and its flight path angle. The secondary effect of a change in pitch is that it causes a change in the thrust requirement to maintain a steady state flight condition. This secondary effect occurs because of the relationship between the angle of attack and the drag. Moreover, the secondary effect of a pitch change is highly variable and can be either positive or negative. The primary effect of a change in thrust is that it causes a change in the aircraft's flight path angle which is, in turn, dependent upon the relationship between the flight path angle, drag and thrust. The secondary effect of a change in thrust is that it causes a change in the angle of attack because of the relationship between the angle of attack, flight path angle and pitch.

Prior art manual and automatic control systems which use computed command signals for control of the aircraft on approach have used a method of control whereby pitch is used to control the aircraft's position on a glide path with the resultant effect that the angle of attack was corrected with thrust corrections. This method is quite useful for cruise flights where strong speed stability exists; however, the use of this method during an approach operation has serious faults since there is a time lag before the effects of a control are observed. For example, if an aircraft is going below the glide path, additional thrust is needed to increase the flight path angle, but the prior art systems have instead changed the pitch to cause the aircraft to fly to the glide path. This causes an increase in angle of attack which is indicated by a decrease in air speed. This change in angle of attack or air speed is then noted and a thrust correction is applied which changes the flight path angle, resulting in a change to the angle of attack. When the aircraft returns to the glide path, the pitch is again changed and the thrust is also varied after the results of the pitch change ae evident.

In my prior U.S. Pat. No. 3,586,268, I disclose an improved flight control system in which, in the approach mode, the angle of attack of the aircraft is controlled entirely by pitch command signals and the position on a glide path is controlled entirely by thrust command signals. Thus, my earlier system implements the principle that the thrust level, rather than the pitch, should be used to correct for glide path displacements, and the pitch should be used to control the angle of attack or air speed. The actual method employed is first, to reduce the rate of displacement of the aircraft from the glide path to zero by thrust control, and second, by further thrust control to gradually return the aircraft to the glide path. The magnitude of the corrective thrust which must be applied for a given angular displacement from the glide path is proportional to the distance the aircraft is from the touch-down point. Hence, corrective thrust for a given angular displacement from the glide path is applied at a greater magnitude when the aircraft is at a greater distance from touch-down. At all times during the thrust corrections, pitch command signals enable the pilot or auto-pilot to control the aircraft with reference to a desired angle of attack. Separate pitch and thrust command displays are provided to facilitate manual approach operation by the pilot.

Existing flight instruments display the horizon reference relative to the aircraft's pitch. The problem with present aircraft instrumentation is that pitch or attitude is not directly usable by the pilot for control of the aircraft. The pitch information must be integrated with other information such as sink rate and air speed for the pilot to determine exactly what is happening to his aircraft. This problem has been recognized in the prior art, and there have been several attempts to provide integrated flight instrumentation. One such example is the patent to J. O. Nesbitt, U.S. Pat. No. 2,941,400 which discloses a flight control indicator having a fixed reference aircraft mark, a rate of change in altitude bar and an angle of attack bar. The Nesbitt instrument displays rate of climb or descent as the primary reference, and while Nesbitt does provide an angle of attack display, this display is not in terms of an angular function the pilot can readily read. Instead, the Nesbitt display causes the angle of attack indicator to go out of view at low angle of attack (high speed) and to descend toward the reference bar at high angles of attack (low speed). When the angle of attack indicator touches the reference bar in the Nesbitt display, the aircraft is in a stall condition (maximum angle of attack for all practical purposes). Thus, Nesbitt's angle of attack bar is really a stall warning device and does not indicate the amount of angle to attack. Furthermore, Nesbitt's choice of having the zero rate of climb reference fixed in terms of the reference bar, causes an increasing sink rate to be read as an increasing upward number, and vice versa, making interpretation of the display rather difficult.

Notwithstanding the limitations just noted, the Nesbitt flight control indicator is admirable for its relative simplicity. The recent trend in the industry is to provide very sophisticated and complex integrated flight instrumentation. Because of their sophistication and the amount of information to be displayed, such flight instruments typically are implemented with cathode ray tube (CRT) displays. Typical of such instrumentation is the U.S. Pat. No. 3,668,622 to James R. Gannett et al. Typically, in such sophisticated flight instrumentation, a number of flight parameters and commands are displayed. For example, in the Gannett et al system, flight path angle is displayed, but it is not correlated to the other functions. The result is a complicated maze of information which is very difficult for the pilot to interpret.

SUMMARY OF THE INVENTION

It is therefore an object of the present invention to provide a unique, integrated flight display which is compatible with my earlier patent to an instrument flight system and method, but which is capable of being used by itself to greatly improve the ease of flight parameter interpretation by a pilot.

It is another and more specific object of this invention to provide a unique flight instrument which displays flight path angle relative to the aircraft reference indicator and greatly simplifies the material to be presented thereby making the pilot's job of interpretation much easier.

A further object of the invention is to provide an aircraft display which is uniquely suitable for use with an aircraft control system which employs thrust level control to correct for glide path displacements and pitch control to maintain a desired angle of attack or air speed.

It is yet another object of my invention to provide an aircraft display including a runway symbol which uses the ground path angle as a horizon reference to indicate where the aircraft is going relative to the runway in the approach mode.

The foregoing and other objects of the invention are obtained by providing a composite situation analyzer (CSA) in which the relationship between the fixed aircraft indicator and the horizon, as far as vertical displacement is concerned, is the aircraft's flight path angle. Actually, what is seen by the pilot is the flight path angle relative to the horizon. In a preferred embodiment, the flight path angle is computed as a function of the vertical velocity, or rate of climb or descent, and the air speed. Alternatively, the flight path angle can be determined in inertial means, if available. Angle of attack is present on the CSA as an angle relative to the flight path angle from the pitch of the aircraft, where the ditch is derived from a remote pitch or attitude gyro. In the display according to the invention, the value of pitch and flight path angle above the horizon are considered positive and those below, the horizon, negative. Angle of attack is always positive with respect to flight path angle. The advantage of this display is that the pilot has instant knowledge of where the aircraft is going relative to the horizon as well as its angle of attack, all without reference to any other instrument. In another version of the display according to the invention, command information is displayed in the form of an angle of attack command and a combination heading and flight path angle or thrust command. Such a system is suitable to the flight system disclosed in my prior U.S. Pat. No. 3,586,268. The system according to the invention being highly adaptable to varying situations is capable in a preferred embodiment of displaying heading command alone if data for thrust command is not available, as for example, in a non-precision approach. In a further refinement of the preferred embodiment, a runway symbol displayed only during the approach mode cooperates with the horizon symbol which is driven by a ground path angle input instead of the flight path angle. The runway symbol is itself driven by a raw data navigation receiver (localizer or radio bearing). The resulting display is an easily interpreted display of where the aircraft is going relative to the ground and to the runway. The invention can be implemented either as a servo-mechanical device, as is now commonly used, or a CRT display, which is preferred in some situations due to its inherent flexibility.

BRIEF DESCRIPTION OF THE DRAWINGS

The specific nature of the invention, as well as other objects, aspects, uses and advantages thereof, will clearly appear from the following description and from the accompanying drawings in which.

DESCRIPTION OF THE PREFERRED EMBODIMENTS

Figures 1, 2, 3:
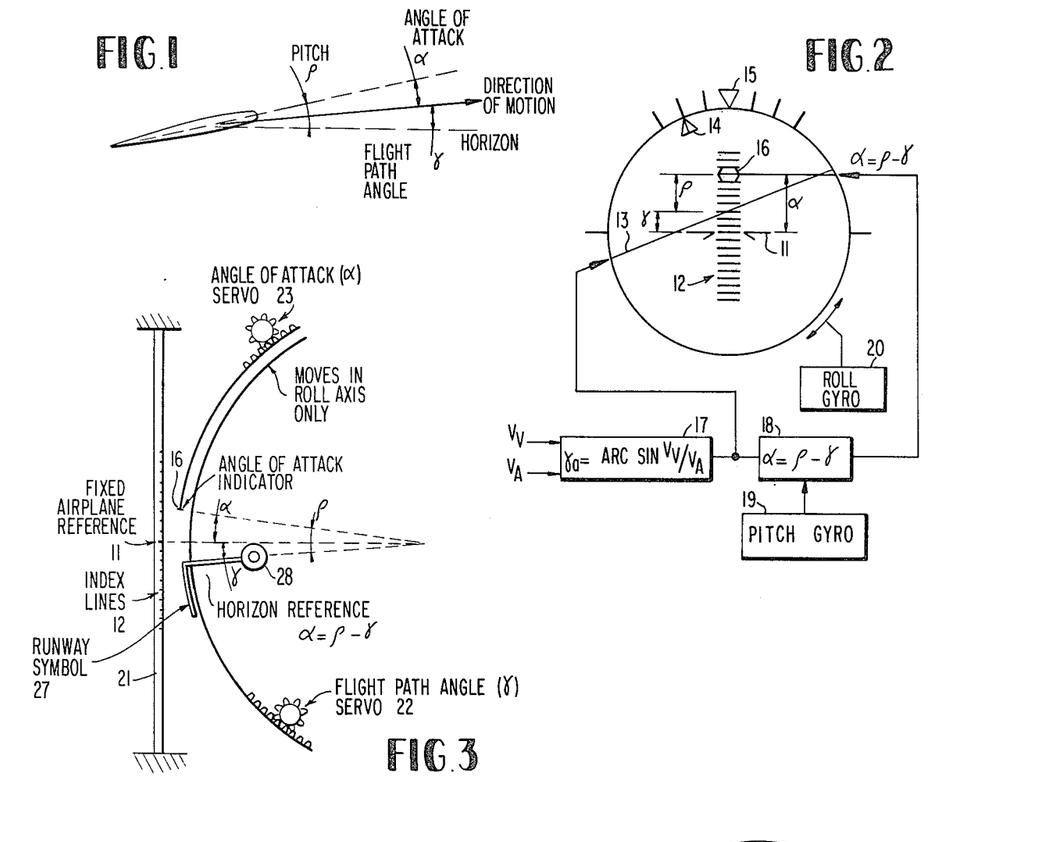
FIG. 1 illustrates the geometric relation between pitch, angle of attack and flight path angle.
FIG. 2 is a block-diagram illustrating the simplest form of the display according to the invention incorporating roll, pitch, angle of attack and flight path angle.
FIG. 3 is a cross-sectional view illustrating a servo-mechanical implemention of the display shown in FIG. 2.

Referring now to the drawings, and more particularly to FIG. 1, there is shown a cord of an aircraft wing with reference to a horizontal or horizon line. The angle of inclination of the wing to the horizon is defined as the pitch represented by $\rho$. The direction of motion vector of the aircraft wing is at an angle $\gamma$ to the horizon. This angle $\gamma$ is the flight path angle. The difference between the pitch angle and the flight angle is the angle of attack $\alpha$. Thus, the angle of attack may be represented by the following expression:

$$\alpha = \rho - \gamma$$

The flight path angle $\gamma$ is itself a function of the vertical velocity or rate of climb or descent $V_v$ and air speed $V_a$ according to the following relationship:

$$\gamma = \arcsin(V_v/V_a)$$

of course, for small flight path angle $\gamma$, this relationship can be simplified to the following expression:

$$\gamma \simeq V_v/V_a$$

The composite situation analyzer display according to the invention is illustrated in its simplest form in FIG. 2. The display is provided with a fixed aircraft indicator 11 and vertical index lines 12. Each index line 12, may, for example, represent 1° of vertical angle. The horizon reference is shown at 13, and for purposes of illustration, a 20° bank angle is indicated. The bank of the aircraft is displayed not only by the inclination of the reference horizon 13, but also by the displacement of a bank indicator 14 with respect to a reference, wings level, indicator 15. Finally, an angle of attack indicator 16 is shown as a vertical displacement from the fixed aircraft reference 11. In the display as illustrated in FIG. 2, in addition to a 20° bank, a flight path angle of −3° and an angle of attack of +8° is shown. Note that pitch is always the relationship between the angle of attack and the horizon, in this case 5°. It will be appreciated that a significant advantage of this display is that the pilot has instant knowledge of where the aircraft is going relative to the horizon as well as its angle of attack, all without reference to any other instrument.

The moveable display indicia, such as the horizon reference, angle of attack and bank, are controlled by inertial reference and the computation of certain flight parameters. Specifically, the flight path angle $\gamma$ which controls the horizon reference is computed by the network 17 as the arc Sin $V_v/V_a$, where $V_v$ is the aircraft vertical velocity and $V_a$ is the air speed. Both $V_v$ and $V_a$ are available as signals in normal aircraft instrumentation. In addition, for small angles $\gamma$ can be simply approximated as the quotient of $V_v/V_a$. Thus, network 17 may be a simple analog dividing network. For more accurate computation, an arc sine function generator would also be required to implement network 17. Both analog divider networks and arc sine function generator networks are well known in the art and require no further explanation. The output signal from network 17 which represents the flight path angle $\gamma$ is used to displace the horizon reference 13 in the display. In addition, the output signal from network 17 is supplied to the summing network 18 which computes the angle of attack $\alpha$. As previously mentioned, the angle of attack $\alpha$ is the difference between the pitch $\rho$ and the flight path angle $\gamma$. The pitch is supplied by a remote pitch gyro 19. The output signal from the summing network 18 representing the angle of attack $\alpha$ is used to control the movement of the angle of attack indicator 16 in the display. Finally, a remote roll gyro 20 is used to rotate the horizon display 13 and the bank angle indicator 14 is a well-known manner. It will be understood by those skilled in the art, that the pitch gyro 19 and the roll gyro 20 may, in fact, be a single 2-degree of freedom angular inertial reference of well-known type.

There are actually a number of ways in which the display illustrated in FIG. 2 can be implemented once the flight path angle $\gamma$ and the angle of attack $\alpha$ have been computed. One such way is illustrated in FIG. 3 wherein the fixed airplane reference 11 and the index lines 12 are inscribed on the back of a transparent face plate 21. The signal from network 17 representing the flight path angle $\gamma$ is used to drive servo 22 to displace the horizon reference 13 with respect to the fixed airplane reference 11. In a similar fashion, the signal from summing network 18 representative of the angle of attack $\alpha$ would be used to energize a servo 23 which would move the angle of attack indictor up and down with respect to the fixed airplane reference 11. Notice that the angular measurement between the horizon reference 3 and the angle of attack indicator 16 is the pitch $\rho$ of the aircraft. In an electro-mechanical implementation of the display shown in FIG. 3, the summing network 18 may be a mechanical differential where flight path angle and pitch are fed into it a shaft positions, and the output shaft position used to displace the angle of attack indicator 16 directly. Alternatively, a differential servo can be used for summing network 18. In viewing FIG. 3, it should be remembered that a third dimension is not shown and that the flight path angle servo 22 and the horizon reference 13 are free to move in the roll axis as well.

Figure 4:
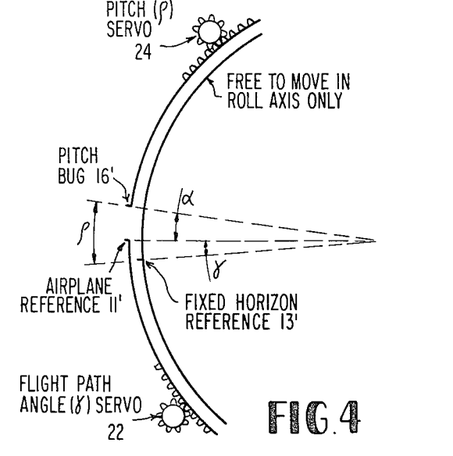
FIG. 4 is a cross-sectional view illustrating an alternative servo-mechanical implementation of the display in FIG. 2.

An alternative implementation of the mechanical display is illustrated in FIG. 4. In this case, however, the horizon reference 13' is fixed, and the airplane reference 11' is moveable in the vertical direction. While the horizon reference 13' is fixed in the vertical direction, it is free to move in the roll axis to display bank of the aircraft. A signal representative of the flight path angle $\gamma$ is computed as before, but in this implementation the flight path angle servo 22 displaces the airplane reference 11' with respect to the fixed horizon reference 13'. It will, of course, be recognized that the relative displacements are exactly the same as illustrated in FIG. 3. As advantage to the implementation illustrated in FIG. 4 is that pitch can be displayed directly in reference to the fixed horizon reference thereby avoiding the need for the summing network 18. More particularly, the output from the pitch gyro 19 is used to drive a pitch servo 24 to displace a pitch bug 16' with respect to the fixed horizon reference 13'. The angle of attack $\alpha$ is then the difference between the airplane reference 11' and the pitch bug 16'. This arrangement allows the face of the instrument to be used as the means for resolving the pitch and flight path angle relationship to determine angle of attack.

Figure 5:
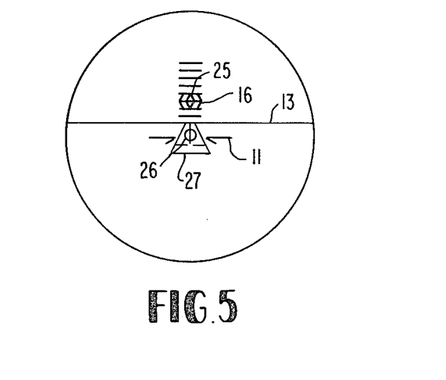
FIG. 5 illustrates the basic display according to the invention with angle of attack command and flight path angle or thrust command displayed.

FIG. 5 shows the composite situation analyzer display with an angle of attack command 25, a flight path angle and heading command 26 and a runway symbol 27 as well as the fixed aircraft indicator 11, the horizon reference 13 and the angle of attack indicator 16. The angle of attack command 25 is computed in the same manner as in my instrument flight system which is the subject of U.S. Pat. No. 3,586,268. The flight path angle command is represented by a vertical displacement of the "bug" 26 with respect to the fixed aircraft reference 11, while the heading command is represented by a lateral or horizontal displacement of the "bug" 26 with respect to the fixed aircraft reference 11. In practice, the flight path angle command is a thrust command as explained in my prior U.S. Pat. No. 3,586,268. The runway symbol 27 moves vertically with the horizon reference 13 and laterally in response to the output of a navigation radio. The runway symbol is displayed only during approach. In the implementation shown in FIG. 3, for example, the runway symbol 27 is carried by a carrier on a lead screw 28 driven by a servo (not shown). The horizon symbol is a slot through which the support for the runway symbol projects. When not in the approach mode, the servo rotates the lead screw until the runway symbol is moved out of view.

Figure 6:
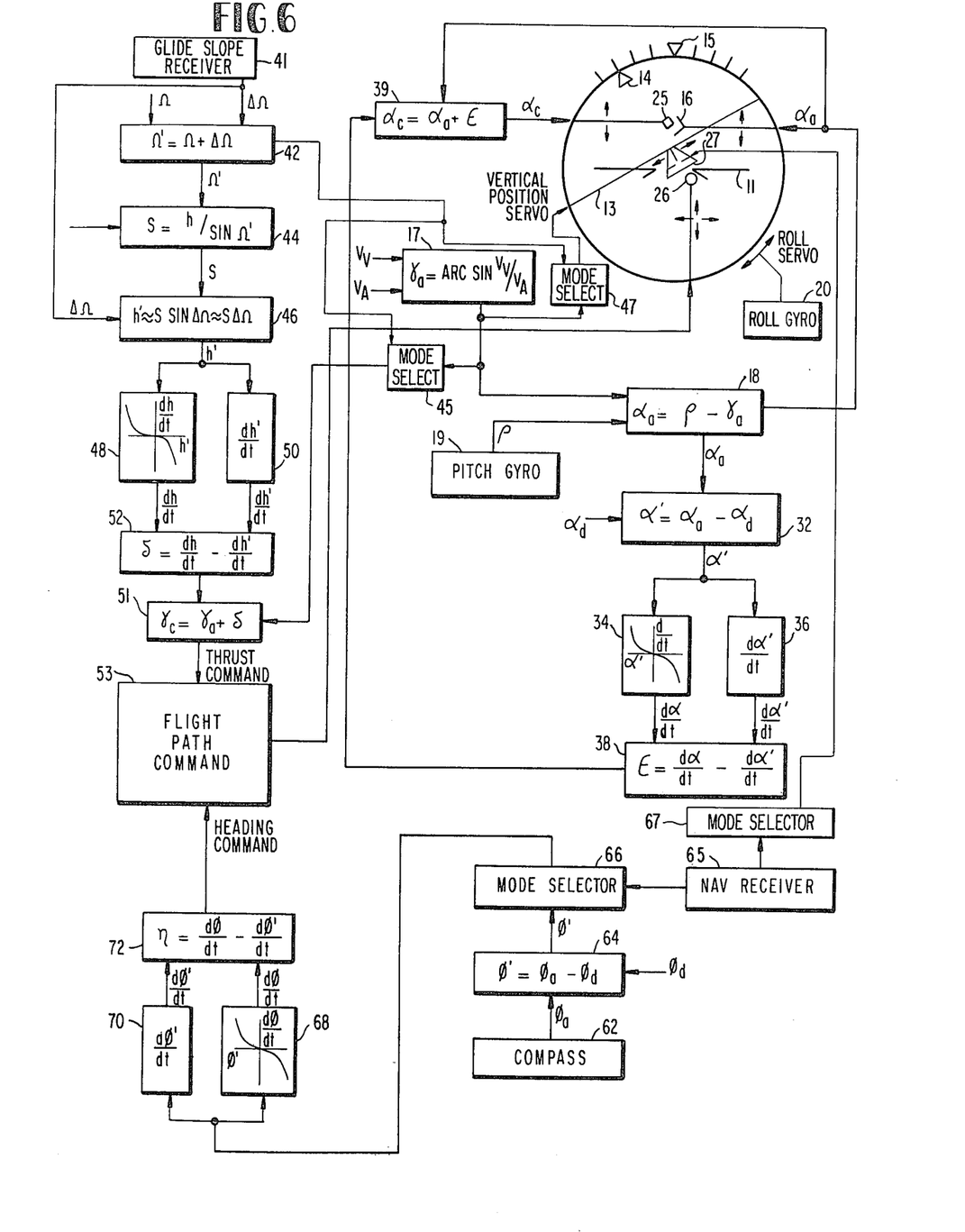
FIG. 6 is a block-diagram illustrating a preferred embodiment of the composite situation analyzer and flight control system according to the invention.

FIG. 6 illustrates how the command functions and runway symbol may be implemented in the basic display shown in FIG. 2. As before, the summing network 18 generates a signal which is representative of the actual angle of attack $\alpha_a$ of the aircraft. However, in addition to controlling the displacement of the angle of attack indicator 16, this signal is also supplied to the summing network 32 which generates a difference signal $\alpha'$ which represents the difference between the actual angle of attack $\alpha_a$ and the desired angle of attack $\alpha_d$.

The shaping network 34 accepts the output of the summing network 32 and determines the rate at which the difference $\alpha'$ between the actual angle of attack and the desired angle of attack should be corrected. This rate of correction is predetermined but is proportionately larger for larger values of $\alpha'$. The differentiator 36 also receives the output $\alpha'$ from summing network 32 and differentiates the $\alpha'$ signal to produce a signal proportional to the rate of change of this variation. The difference between the outputs of the shaping network 34 and the differentiator 36 is then calculated by the summing network 38 to produce a signal that represents the difference $\epsilon$ between the desired rate of return and the actual rate of return. The angle of attack command signal $\alpha_c$ is generated by summing difference signal $\epsilon$ with the actual angle of attack signal in a summing network 39. This signal is displayed by the angle command $\alpha_c$ bug 25 on the composite situation analyzer display. When the actual angle of attack is at the desired value, the angle of attack indicator 16 and the command bug 25 will be vertically coincident. Any rate of change of the angle of attack will be sensed immediately, and the bug 25 will show the direction in which to change pitch of the aircraft in order to zero the rate of change of the angle of attack. Furthermore, departure from the desired angle of attack will result in a corrective rate of return of the desired angle of attack. For example, if the angle of attack is increased to some value greater than that desired, then its rate of change is in the positive direction, and the indicator will show a negative value indicating a negative pitch correction is required by the pilot or the auto-pilot. As soon as the actual rate of change of the angle of attack reverses and becomes equal to the desired rate of return, the command angle of attack bug 25 will center opposite the angle of attack indicator 16. Then, as the desired angle of attack is approached, the bug 25 will gradually rise because of the lesser amount of correction called for by the shaping network 34. By making the appropriate pitch corrections, the pilot or auto-pilot can keep the bug 24 zeroed and cause a perfect return to the desired angle of attack. In the thrust command computer, the angle $\Omega$ between ground level and the desired position of the aircraft on the glide path and the angular difference $\Delta\Omega$ between this angle and the angle between the actual position of the aircraft and ground level are conveniently determined and used as inputs to the summing network 42 which calculates the angle $\Omega'$ between the actual position of the aircraft and ground level. The altitude $h$ of the aircraft above the runway is determined by substracting the field elevation from the aircraft's actual altitude above mean sea level. This altitude $h$ with the output from the summing network 42 provides the inputs to the dividing network 44. The actual distance S of the aircraft from the landing field is calculated by the dividing network 44 which divides the altitude $h$ by sin $\Omega'$. A multiplier 46 calculates the linear displacement $h'$ of the aircraft from the desired glide path since, for small angles, sin $\Delta\Omega = \Delta\Omega$. Alternate means to determine the displacement $h'$ can be substituted. Taking the $\Delta\Omega$ signal from the glide slope receiver and modifying it with a linear gain program based upon time fom a fixed ground reference such as the outer marker or from an elevation above the ground will provide an approximation of linear displacement $h'$ from the desired glide path position, or modifying the $\Delta\Omega$ signal with a distance signal from a ground source will produce an accurate value of $h'$. It is also possible to use $\Delta\Omega$ directly without modification because the method of flight control utilized by the present invention does not cause oscillations as the sensitivity of the glide path increases. The rate of return $dh/dt$ to correct for this linear displacement $h'$ is determined by shaping network 48. The rate of the correction is predetermined but is proportionately larger for a larger linear displacement. The linear displacement $h'$ is also differentiated by the differentiating network 50 to determine the actual rate of displacement of the aircraft from the desired glide path. The outputs of the shaping network 48 and the differentiator 50 are applied as inputs to a summing network 52 which produces an output signal $\delta$ which is proportional to the difference between these input signals. The difference signal $\delta$ is added to the actual thrust signal $\gamma_a$ from network 17 in summing networks 51 to produce an output signal. This output signal is the thrust command $\gamma_c$ and is supplied to the flight path command network 53. The thrust command is displayed by vertical displacement of the bug 26. Adding or subtracting thrust to zero the bug 26 with respect to the fixed aircraft reference 11, results in a smooth flight and a return to the glide path. By employing this method, a rate of displacement from the glide path is immediately indicated, and a signal is displayed as a thrust command for corrective action. In addition, the aircraft will return to the glide path from any displaced position at the desired rate by merely keeping the bug 26 zeroed vertically with respect to the aircraft reference 11.

In the heading command computer, the actual heading $\Phi_a$ derived from a compass 62 is supplied as one input o the summing network 64. The other input to the summing network 64 is the desired heading $\Phi_d$. The summing network 64 computes the difference $\Phi'$ of the actual heading and the desired heading and supplies a difference signal to mode selector 66. A signal analogous to the heading difference signal $\Phi'$ is also supplied to the mode selector 66 from a navigation receiver 65 of well-known type. Thus, the mode selector 66 may selectively provide the output of summing network 64 or the output of the navigation receiver 65 to the inputs of the shaping network 68 and the differentiating network 70. The rate of return $d\Phi/dt$ to correct for lateral displacement in heading $\Phi'$ is determined by the shaping network 68. The rate of correction is predetermined but is proportionately larger for a larger linear displacement. The displacement in heading $\Phi'$ is also differentiated by differentiating network 70 to determine the actual rate of displacement of the aircraft from the desired heading. The outputs of the shaping network 68 and the differentiator 70 are applied as inputs to a summing network 72 which produces an output signal $\eta$ which is proportional to the difference between these two input signals. This output signal $\eta$ is the heading command and is provided to the flight path command network 53. The output of flight path command network 53, while illustrated as one line for sake of simplicity and clarity, is in fact two signals: one driving the bug 26 vertically and the other driving the bug 26 horizontally. The heading command is displayed as a lateral displacement of the bug 26. Thus, a rate of displacement from the desired heading is immediately indicated and displayed as a heading command for corrective action. The aircraft will return to the proper heading from any displaced position at the desired rate by merely keeping the bug 26 zeroed laterally or horizontally with respect to the fixed aircraft reference 11.

In the preferred embodiment, the shaping networks 34, 48 and 68 implement simple linear relationships of the type $Y = -K_1 X$, where the output $Y$ is a negative linear relationship of the input $X$, and $K_1$ is a constant of proportionality. As is well known, operational amplifiers with resistive input and feedback networks exhibit this form of response.

Figure 7:
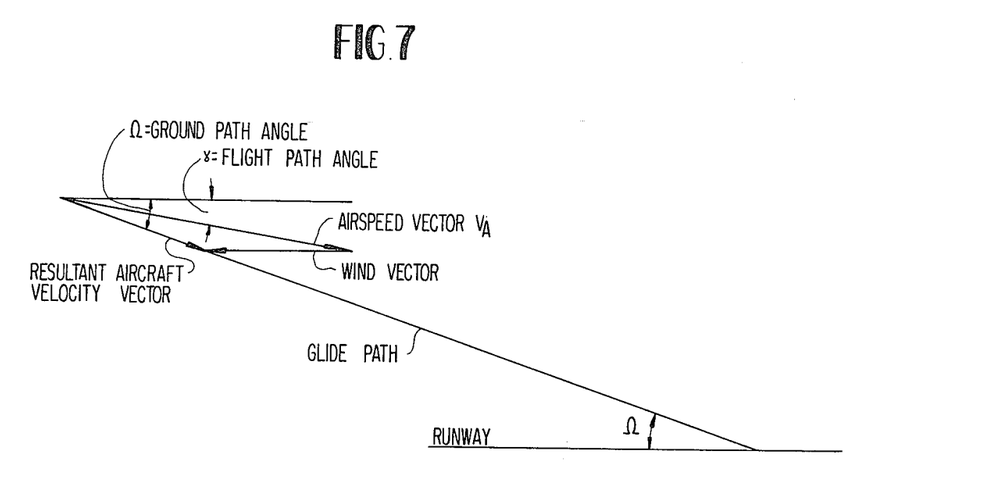
FIG. 7 illustrates the velocity vectors on approach.

The runway symbol 27 is displayed only during approach. It moves laterally below the horizon 13 in response to the output of navigation receiver 65 via mode selector 67. However, in this mode ground path angle $\Omega + \Delta\Omega$ is substituted for flight path angle $\gamma_a$ is the display. This offers the advantage that the projection of the aircraft symbol relative to the horizon is really where the aircraft is going relative to the ground. To understand this, reference is made to FIG. 7 which shows the geometry of approach with a head wind. It will be observed that due to the head wind, the ground path angle is greater than the flight path angle. If $\gamma_a$ from computer 17 is used as an input to summing network 51, the horizon reference 13 will display whatever flight path angle is required to fly the glide slope. However, if $\Omega + \Delta\Omega$ is used as the input to summing network 51, the horizon reference 13 will display the aircraft's angular position relative to the runway touchdown point or in other words the aircraft's position relative to the glide slope with the zero reference point being exactly $\Omega°$ below the horizon. This is advantageous in that the pilot sees the aircraft's trajectory relative to the ground. To accomplish this result, a glide slope receiver 41 provides the $\Delta\Omega$ input to the summing network 42. The desired ground path angle or glide slope angle may be set as the $\Omega$ input to the summing network 42. The computed ground path angle $\Omega'$ is supplied as an input to summing network 51 through the mode selector 45, replacing $\gamma_a$ from computer 17.

Those skilled in the art will understand that the command signals $\alpha_c$ and $\gamma_c$ must be displayed relative to the actual signals. In other words, the signal causing movement of the $\alpha_c$ bug 25 must be a summation of the $\alpha_{aL}$ and $\epsilon$ signals, and the signal causing movement of the $\gamma_c$ bug 26 in the vertical direction must be the summation of the $\gamma_a$ and $\delta$ signals. The heading command does not require a similar summation since the center of the display is the zero reference point for the heading command. On the other hand, the zero reference points for the angle of attack and thrust commands are $\alpha_a$ and $\gamma_a$, respectively.

Figure 8:
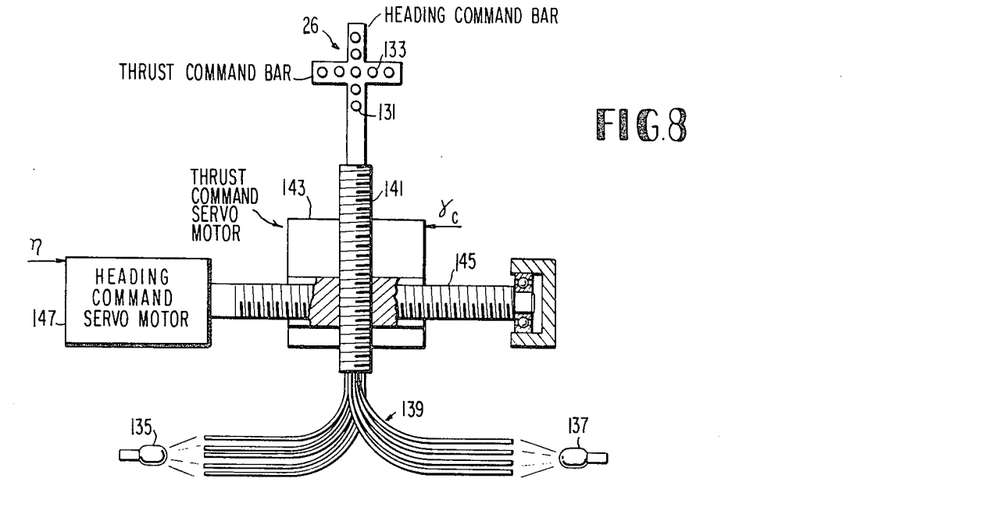
FIG. 8 is a partially cross-sectional view illustrating a preferred embodiment of the flight path command symbol used in the composite situation analyzer and flight control system illustrated in FIG. 6.

FIG. 8 is a preferred alternative embodiment of the flight path command bug 26 which permits the display to be used to show only heading command if data for thrust command is not available. The bug 26 in this embodiment takes the form of a cross with the vertical member or heading command bar and a horizontal member or thrust command bar. The cross is preferrably made of a transparent material so as not to obscure other portions of the display but is made highly visable by a vertical row of lights 131 and a horizontal row of lights 133. The rows of lights 131 and 133 are actually the ends of optical fibers which are separately illuminated at their opposite ends by a heading command light source 135 and a thrust command light source 137, respectively. The optical fibers 139 pass through a lead screw 141 to the bug 26. The lead screw is driven by the thrust command servo 143 to move the bug 26 vertically. Horizontal movement of the bug 26 is accomplished by lead screws 145 which carries servo 143 and is in turn driven by heading command servo 147.

In operation, if only heading command is used, then only the vertical row of lights 31 are illuminated by the heading command light 35. If data is available for thrust command, all lights 31 and 33 are illuminated by heading and thrust command light 35 and 37. When neither heading or thrust commands are generated, it is desirable to retract the bug 26 to the bottom of the composite situation analyzer display out of the field of vision. This is readily accomplished by the thrust command servo 43. By applying a bias signal to the thrust command servo motor any time a heading command is used (with or without a thrust command), the bug 26 will be made to appear in the display.

Figure 9:
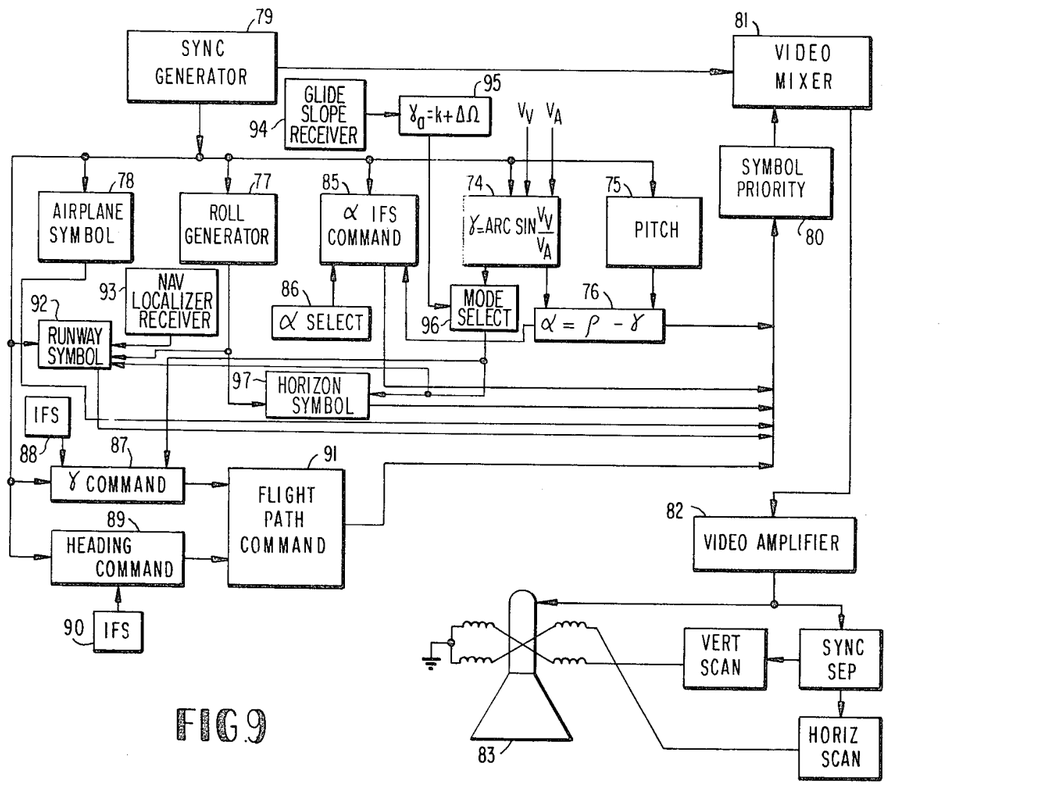
FIG. 9 is a block-diagram illustrating the manner of implementing the composite situation analyzer and flight control system with a CRT display.

While the system illustrated in FIG. 6 could be implemented mechanically in a manner similar to that illustrated in FIGS. 2 and 3 of the drawings, it will be recognized by those skilled in the art that the more complex display of FIG. 6 with its command indicia readily lends itself to implementation in a cathode ray tube (CRT) display. Such a CRT system is illustrated in FIG. 9 and, of course, displays the same data as the mechanical displays. As in the mechanical display, the CRT display receives inputs from a plurality of sensors and pilot-operated controls. From these inputs, a plurality of symbol generators develop pulses which define the location, at any given instant in time, of each symbol to be displayed. For example, the network 74 receives the aircraft vertical velocity $V_v$ and air speed $V_a$ and computes the flight path angle $\gamma$ and provides an output signal indicative of the displacement of the horizon reference symbol. Network 75 received pitch information from the remote pitch gyro and generates a signal indicative of the aircraft pitch. From the outputs of networks 74 and 75, the summing network 76 computes the angle of attack $\alpha$. The output of the summing network 76 is then a signal indicative of the displacement of the angle of attack symbol. The remote gyro also supplies roll information to the roll generator network 77 which provides an output signal indicative of the bank symbol. The outputs of the network 74 and roll generator are supplied to the horizon symbol generator 97 which provides an output signal indicative of the horizon. While the aircraft symbol could be inscribed on the face of the CRT display, it can also be generated by the airplane symbol generator 78 shown in FIG. 7. Those skilled in the art will recognize that the functions of the networks thus far described are analogous to the basic display shown in FIG. 2 of the drawings. Each of the ntworks 74 and 75 and the roll symbol generator 77 and airplane symbol generator 78 are controlled by a sync generator 79 in a conventional manner. The outputs of the summing network 76, the horizon symbol generator 97 and the airplane generator 78 are supplied to the symbol priority circuit 80 and thence to the video mixer 81 which is also controlled by the sync generator 79. The output of the video mixer 81 is supplied to a video amplifier 82 which controls the electron beam of a cathode ray tube 83. The cathode ray tube beam is scanned in a well-known manner both vertically and horizontally to generate the display.

Angle of attack command and flight path command can also be displayed in the CRT system shown in FIG. 9. To this end, an $\alpha$ command computer 85, similar to that shown in FIG. 6 of the drawings, is controlled by the sync generator 79 and receives as inputs the output of the summing network 76 and the desired angle of attack selector 86 and generates a signal corresponding to the $\alpha$ command symbol. The output signal from the command computer 85 is supplied to the symbol priority network 80. There is also provided a flight path angle or thrust command computer 87 also controlled by the sync generator 79 and receiving as an input the desired aircraft glide path angle from selector 88. A heading command computer 89 controlled by the sync generator 79 and receiving as an input the desired heading angle from selector 90 is also provided. It will be recognized that both the thrust command computer 87 and the heading command computer 89 are similar to the corresponding computers shown in FIG. 6 of the drawings. The outputs of both the computers 87 and 89 are supplied to the flight path command circuit 91 which provides an output signal indicative of the thrust and heading command symbol to the symbol priority circuit 80. The symbol priority circuit 80 is designed to provide a priority of the various symbols to avoid overlapping of symbols.

In the approach mode, a runway symbol may be generated by the runway symbol generator 92 in response to the output of the navigation receiver 93. As before, ground path angle may be substituted for flight path angle in the display. To this end, a glide slope receiver 94 provides an output to the summing network 95, the latter of which corresponds to summing network 42 in FIG. 6. The substitution of ground path angle for flight path angle is made by mode selector 96.

It will be apparent that the embodiments shown are only exemplary, and that various modifications can be made in construction and arrangement within the scope of the invention as defined in the appended claims.

What is claimed is:

1. An aircraft control system display comprising:
   an aircraft reference indicator,
   a horizon reference indicator,
   means for producing a relative displacement of said aircraft and horizon reference indicators as a function of flight path angle of the aircraft,
   an angle of attack indicator,
   means for producing a displacement of said angle of attack indicator with respect to said aircraft reference indicator as a function of the difference between the pitch and the flight path angle of the aircraft,
   means for selectively generating a runway reference indicator below said horizon reference indicator, and
   means for producing a relative displacement of said aircraft and horizon reference indicators proportional to the ground path angle of the aircraft.

2. An aircraft control system display as recited in claim 1 wherein said aircraft reference indicator is fixed on the display and the horizon reference is moveable vertically.

3. An aircraft control system display as recited in claim 2 wherein said horizon reference is also moveable in the roll axis and further comprising means for producing an angular displacement of said horizon reference indicator as a function of the bank angle of the aircraft.

4. An aircraft control system display as recited in claim 1 further comprising:
   means for computing the flight path angle of the aircraft as a function of the ratio of the aircraft vertical velocity and air speed and supplying selectively a control signal to said means for producing a relative displacment of said aircraft and horizon reference indicators, and
   means displacing said runway reference indicator laterally below said horizon reference indicator as a function of the aircraft's lateral displacment with respect to a runway.

5. An aircraft control system display as recited in claim 4 further comprising:
   an angle of attack command indicator, and
   means for vertically displacing said angle of attack command indicator with respect to said angle of attack indicator as a function of the rate of change of the angle of attack and in a direction to show the direction in which to change the pitch of the aircraft to zero the rate of change of the angle of attack.

6. An aircraft control system display as recited in claim 5 wherein said means for vertically displacing said angle of attack command indicator comprises:
   computing means for determining the angular displacement of the aircraft from the desired angle of attack, and
   computing means for determining the rate at which the aircraft is being angularly displaced from the desired angle of attack, whereby the aircraft's angular rate of displacement from the desired angle of attack may be first reduced to zero and the aircraft's angular displacement from the desired angle of attack may be secondly reduced to zero.

7. An aircraft control system display as recited in claim 4 further comprising:
   a thrust command indicator, and
   means for vertically displacing said thrust command indicator with respect to said aircraft reference indicator as a function of the rate of change of displacement of the aircraft from the desired glide path and in a direction to show the direction in which to change the thrust to return the aircraft to the desired glide path.

8. An aircraft control system display as recited in claim 7 wherein said means for vertically displacing said thrust command indicator comprises:
   computing means for determining the displacement of the aircraft from the desired glide path, and
   computing means for determining the rate at which the aircraft is being displaced from the desired glide path, whereby the aircraft's rate of displacement from the desired glide path may be first reduced to zero and the aircraft's displacement from the desired glide path may be then reduced to zero.

9. An aircraft control system display as recited in claim 4 wherein said means for selectively producing a relative displacement of said aircraft and horizon reference indicators as a function of ground path angle of the aircraft comprises mode selector means interposed between said means for computing the flight path angle and said means for producing a relative displacement of said aircraft and horizon reference indicators for substituting ground path angle for flight path during approach.

10. An aircraft control system display as recited in claim 9 further comprising:
    a heading command indicator, and
    means for horizontally displacing said heading command indicator with respect to said aircraft reference indicator as a function of the rate of change of displacement of the aircraft from the desired heading and in a direction to show the directionin which to change the heading to return the aircraft to the desired heading.

11. An aircraft control system display as recited in claim 10 wherein said means for horizontally displacing said heading command indicator comprises:

computing means for determining the rate at which the aircraft is being displaced from the desired heading, whereby the aircraft's rate of displacement from the desired heading may be reduced to zero.

12. An aircraft control system display as recited in claim 9 further comprising:

an angle of attack command indicator, means for vertically displacing said angle of attack command indicator with respect to said angle of attack indicator as a function of the rate of change of the angel of attack and in a direction to show the direction in which to change the pitch of the aircraft to zero the rate of change of the angle of attack,     a thrust command indicator,     means for vertically displacing said thrust command indicator with respect to said aircraft reference indicator as a function of the rate of change of displacement of the aircraft from the desired glide path and in a direction to show the direction in which to change the thrust to return the aircraft to the desired glide path,     a heading command indicator, and     means for horizontally displacing said heading command indicator with respect to said aircraft reference indicator as a function of the rate of change of displacement of the aircraft from the desired heading and in a direction to show the direction in which to change the heading to return the aircraft to the desired heading.

13. An aircraft control system display as recited in claim 12 wherein said means for vertically displacing said angle of attack command indicator comprises computing means for determining the angular displacment of the aircraft from the desired angle of attack,     computing means for determining the rate at which the aircraft is being angularly displaced from the desired angle of attack, whereby the aircraft's angular rate of displacement from the desired angle of attack may be first reduced to zero and the aircraft's angular displacement from the desired angle of attack may be secondly reduced to zero, wherein said means for vertically displacing said thrust command indicator comprises computing means for determining the displacement of the aircraft from the desired glide path, and     computing means for determining the rate at which the aircraft is being displaced from the desired glide path, whereby the aircraft's rate of displacement from the desired glide path may be first reduced to zero and the aircraft's displacement from the desired glide path may be then reduced to zero, and wherein     said means for horizontally displacing said heading command indicator comprises computing means for determining the rate at which the aircraft is being displaced from the desired heading, whereby the aircraft's rate of displacement from the desired heading may be reduced to zero.

14. An aircraft control system display as recited in claim 13 wherein said display is a cathode ray tube display further comprising:

display synchronizing means, a plurality of symbol generator means synchronized by said synchronizing means and receiving as inputs the outputs of said means for producing a relative displacement of said aircraft and horizon reference indicators, said means for producing a displacement of said angle of attack indicators, said means for vertically displacing said angle of attack command indicator, said means for vertically displacing said thrust command indicator, said means for horizontally displacing said heading command indicator, and said means for laterally displacing said runway reference indicator, said plurality of symbol generator means producing output signals defining the location, size and shape of each of said indicators,     priority means receiving the outputs of each of said symbol generator means and providing as an output at any instant in time only one symbol generator means output signal,     mixing means receiving the outputs of said display synchronizing means and said priority means for generating an output video display signal.

15. An aircraft control system display as recited in claim 14 wherein said thrust command indicator and said heading command indicator are combined to form a flight path command indicator moveable in both vertical and horizontal directions.

* * * * *